United States Patent
Johri et al.

(10) Patent No.: US 10,370,000 B2
(45) Date of Patent: Aug. 6, 2019

(54) METHOD FOR CREEP CANCELLATION IN HYBRID DRIVELINES

(71) Applicant: Ford Global Technologies, LLC, Dearborn, MI (US)

(72) Inventors: Rajit Johri, Canton, MI (US); Francis Thomas Connolly, Ann Arbor, MI (US); Fazal Urrahman Syed, Canton, MI (US); Minku Lee, Ypsilanti, MI (US); Mark Steven Yamazaki, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 315 days.

(21) Appl. No.: 15/351,568

(22) Filed: Nov. 15, 2016

(65) Prior Publication Data

US 2018/0134298 A1    May 17, 2018

(51) Int. Cl.
| | |
|---|---|
| *B60W 30/18* | (2012.01) |
| *B60W 10/02* | (2006.01) |
| *B60W 10/08* | (2006.01) |
| *B60W 10/184* | (2012.01) |
| *B60W 20/00* | (2016.01) |
| *F16H 61/48* | (2006.01) |

(52) U.S. Cl.
CPC .... *B60W 30/18063* (2013.01); *B60W 10/023* (2013.01); *B60W 10/08* (2013.01); *B60W 10/184* (2013.01); *B60W 20/00* (2013.01); *F16H 61/48* (2013.01); *B60W 2540/10* (2013.01); *B60W 2540/12* (2013.01); *B60Y 2300/18058* (2013.01); *Y10S 903/93* (2013.01); *Y10S 903/946* (2013.01); *Y10S 903/947* (2013.01)

(58) Field of Classification Search
CPC ....... B60W 30/18063; B60W 2540/12; B60W 10/18
See application file for complete search history.

(56) References Cited

U.S. PATENT DOCUMENTS

| | | | |
|---|---|---|---|
| 8,602,939 B2 * | 12/2013 | Yamazaki | B60W 20/14 477/5 |
| 9,315,186 B1 | 4/2016 | Huh et al. | |
| 9,327,721 B2 | 5/2016 | Johri et al. | |
| 2016/0090006 A1 | 3/2016 | Yamazaki et al. | |

* cited by examiner

*Primary Examiner* — Derek D Knight
(74) *Attorney, Agent, or Firm* — David Kelley; Brooks Kushman, P.C.

(57) ABSTRACT

According to one embodiment of this disclosure, a vehicle having an electric machine and at least one controller is described. The electric machine may be configured to generate creep torque to move the vehicle. The controller may be programmed to decrease a target speed of a torque converter impeller to create a desired brake torque and partially cancel the creep torque without application of friction brakes in response to a brake pedal being pressed while an accelerator pedal is not being pressed.

18 Claims, 4 Drawing Sheets

METHOD FOR CREEP CANCELLATION IN HYBRID DRIVELINES

TECHNICAL FIELD

The present disclosure relates to cancelling or otherwise preventing the application of creep torque in a hybrid vehicle.

BACKGROUND

Conventional vehicles include an internal combustion engine that acts as the sole source of propulsion power in the vehicle. When an operator of a conventional vehicle releases the brake pedal when the vehicle is at a complete stop, a small amount of torque is realized at the wheels due to the torque from the engine operating at idle speed. This is commonly referred to as "creep torque."

Hybrid electric vehicles (HEVs) include an electric machine (e.g., motor/generator) operatively coupled to the powertrain that can supplement or replace the torque from the engine to propel the vehicle. The electric machine can also provide a positive amount of torque to the wheels to simulate creep torque from the engine. The electric machine can be utilized and controlled to conserve fuel. Particular control of the electric machine should be given at times in which the vehicle is prone to creeping, as these are prime opportunities to conserve a relatively large amount of energy.

SUMMARY

According to one embodiment of this disclosure, a vehicle having an electric machine and at least one controller is described. The electric machine may be configured to generate creep torque to move the vehicle. The controller may be programmed to decrease a target speed of a torque converter impeller to create a desired brake torque and partially cancel the creep torque, without application of friction brakes, in response to a brake pedal being pressed while an accelerator pedal is not being pressed.

According to another embodiment of this disclosure, a method for a hybrid vehicle is described. The method may include reducing, by a controller, a target speed of a torque converter impeller to create a desired brake torque and partially cancel creep torque without application of friction brakes in response to a brake pedal being pressed while an accelerator pedal is not being pressed.

According to another embodiment of this disclosure, a system for a vehicle is described. The system may include an electric machine to generate a creep torque and at least one controller programmed to decrease a target speed of a torque converter impeller from an impeller idle speed to a minimum speed to create a desired brake torque and partially cancel creep torque without application of friction brakes. The controller acts in response to a brake pedal being pressed while an accelerator pedal is not being pressed.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicles equipped with an automatic transmission move slowly when the accelerator pedal is not applied and the transmission is in a forward moving gear or a reverse gear. This slow movement is referred to as vehicle creep. Creep is often due to controlling the speed of the engine to idle. The speed difference across the torque converter, speed of the impeller and the speed of the turbine, results in a torque transfer across the torque converter. Typically, vehicle creep speed is controlled by controlling the torque source (often the engine). Torque from the engine is transferred across a torque converter at the driveline.

Figure 1:
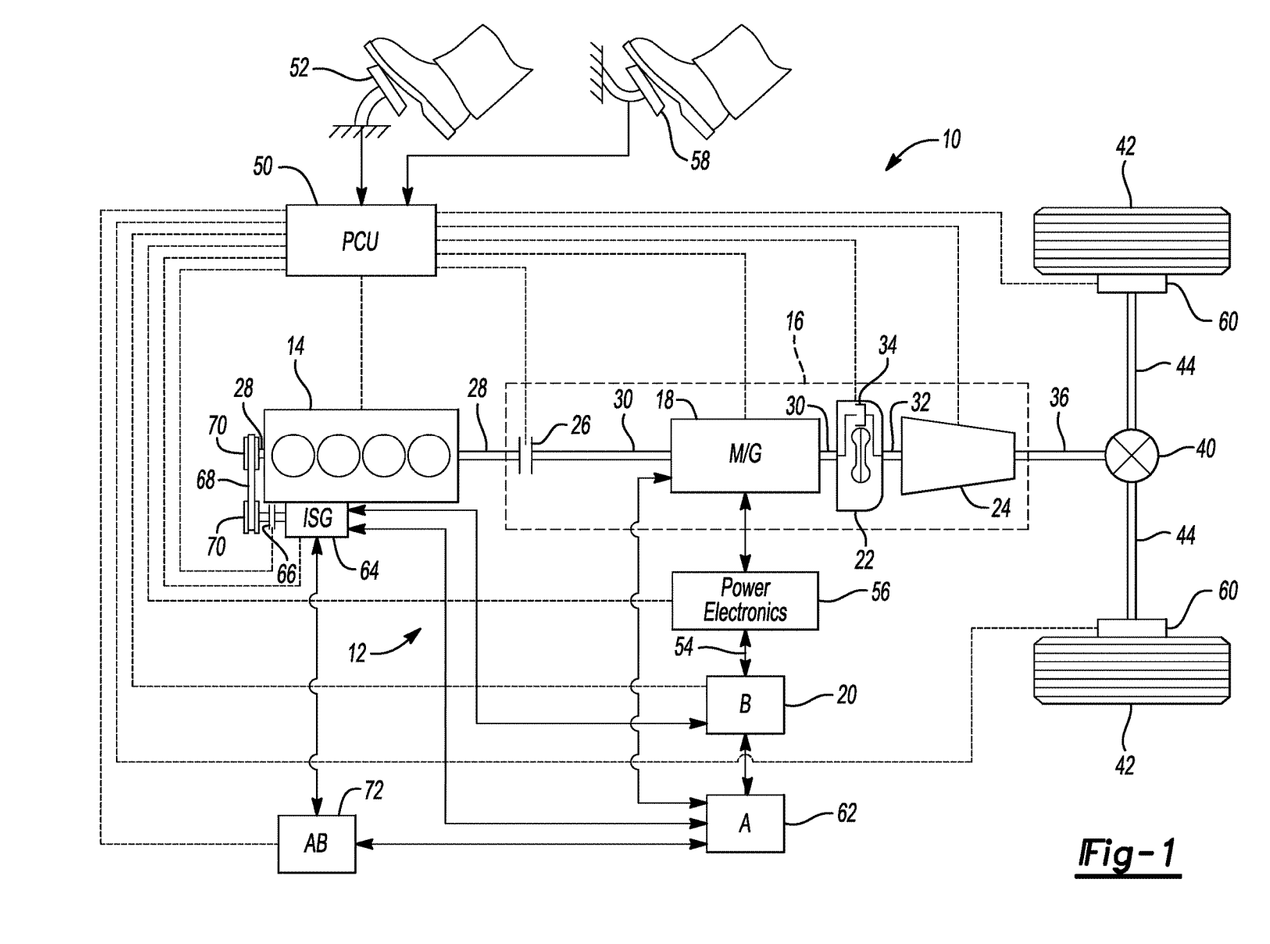
FIG. 1 is a schematic drawing of a vehicle powertrain.

Referring to FIG. 1, a schematic diagram of a hybrid electric vehicle (HEV) 10 is illustrated according to an embodiment of the present disclosure. FIG. 1 illustrates representative relationships among the components. Physical placement and orientation of the components within the vehicle may vary. The HEV 10 includes a powertrain 12. The powertrain 12 includes an engine 14 that drives a transmission 16, which may be referred to as a modular hybrid transmission (MHT). As will be described in further detail below, transmission 16 includes an electric machine such as an electric motor/generator (M/G) 18, an associated traction battery 20, a torque converter 22, and a multiple step-ratio automatic transmission, or gearbox 24.

The engine 14 and the M/G 18 are both drive sources for the HEV 10 that are configured to propel the HEV 10. The engine 14 generally represents a power source that may include an internal combustion engine such as a gasoline, diesel, or natural gas powered engine, or a fuel cell. The engine 14 generates an engine power and corresponding engine torque that is supplied to the M/G 18 when a disconnect clutch 26 between the engine 14 and the M/G 18 is at least partially engaged. The M/G 18 may be implemented by any one of a plurality of types of electric machines. For example, M/G 18 may be a permanent magnet synchronous motor. Power electronics condition direct current (DC) power provided by the battery 20 to the requirements of the M/G 18, as will be described below. For example, power electronics may provide three phase alternating current (AC) to the M/G 18.

When the disconnect clutch 26 is at least partially engaged, power flow from the engine 14 to the M/G 18 or from the M/G 18 to the engine 14 is possible. For example, the disconnect clutch 26 may be engaged and M/G 18 may operate as a generator to convert rotational energy provided by a crankshaft 28 and M/G shaft 30 into electrical energy to be stored in the battery 20. The disconnect clutch 26 can also be disengaged to isolate the engine 14 from the remainder of the powertrain 12 such that the M/G 18 can act as the sole drive source for the HEV 10. Shaft 30 extends through the M/G 18. The M/G 18 is continuously drivably connected to the shaft 30, whereas the engine 14 is drivably connected to the shaft 30 only when the disconnect clutch 26 is at least partially engaged.

The M/G 18 is connected to the torque converter 22 via shaft 30. The torque converter 22 is therefore connected to the engine 14 when the disconnect clutch 26 is at least partially engaged. The torque converter 22 includes an impeller fixed to M/G shaft 30 and a turbine fixed to a transmission input shaft 32. The torque converter 22 thus provides a hydraulic coupling between shaft 30 and transmission input shaft 32. The torque converter 22 transmits power from the impeller to the turbine when the impeller rotates faster than the turbine. The magnitude of the turbine torque and impeller torque generally depend upon the relative speeds. When the ratio of impeller speed to turbine speed is sufficiently high, the turbine torque is a multiple of the impeller torque. A torque converter bypass clutch (also known as a torque converter lock-up clutch) 34 may also be provided that, when engaged, frictionally or mechanically couples the impeller and the turbine of the torque converter 22, permitting more efficient power transfer. The torque converter bypass clutch 34 may be operated as a launch clutch to provide smooth vehicle launch. Alternatively, or in combination, a launch clutch similar to disconnect clutch 26 may be provided between the M/G 18 and gearbox 24 for applications that do not include a torque converter 22 or a torque converter bypass clutch 34. In some applications, disconnect clutch 26 is generally referred to as an upstream clutch and launch clutch 34 (which may be a torque converter bypass clutch) is generally referred to as a downstream clutch.

The gearbox 24 may include gear sets (not shown) that are selectively placed in different gear ratios by selective engagement of friction elements such as clutches and brakes (not shown) to establish the desired multiple discrete or step drive ratios. The friction elements are controllable through a shift schedule that connects and disconnects certain elements of the gear sets to control the ratio between a transmission output shaft 36 and the transmission input shaft 32. The gearbox 24 is automatically shifted from one ratio to another based on various vehicle and ambient operating conditions by an associated controller, such as a powertrain control unit (PCU). Power and torque from both the engine 14 and the M/G 18 may be delivered to and received by gearbox 24. The gearbox 24 then provides powertrain output power and torque to output shaft 36.

It should be understood that the hydraulically controlled gearbox 24 used with a torque converter 22 is but one example of a gearbox or transmission arrangement; any multiple ratio gearbox that accepts input torque(s) from an engine and/or a motor and then provides torque to an output shaft at the different ratios is acceptable for use with embodiments of the present disclosure. For example, gearbox 24 may be implemented by an automated mechanical (or manual) transmission (AMT) that includes one or more servo motors to translate/rotate shift forks along a shift rail to select a desired gear ratio. As generally understood by those of ordinary skill in the art, an AMT may be used in applications with higher torque requirements, for example.

As shown in the representative embodiment of FIG. 1, the output shaft 36 is connected to a differential 40. The differential 40 drives a pair of wheels 42 via respective axles 44 connected to the differential 40. The differential transmits approximately equal torque to each wheel 42 while permitting slight speed differences such as when the vehicle turns a corner. Different types of differentials or similar devices may be used to distribute torque from the powertrain to one or more wheels. In some applications, torque distribution may vary depending on the particular operating mode or condition, for example.

The powertrain 12 further includes an associated controller 50 such as a powertrain control unit (PCU). While illustrated as one controller, the controller 50 may be part of a larger control system and may be controlled by various other controllers throughout the vehicle 10, such as a vehicle system controller (VSC). It should therefore be understood that the powertrain control unit 50 and one or more other controllers can collectively be referred to as a "controller" that controls various actuators in response to signals from various sensors to control functions such as starting/stopping engine 14, operating M/G 18 to provide wheel torque or charge the battery 20, select or schedule transmission shifts, etc. Controller 50 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller in controlling the engine or vehicle.

The controller communicates with various engine/vehicle sensors and actuators via an input/output (I/O) interface (including input and output channels) that may be implemented as a single integrated interface that provides various raw data or signal conditioning, processing, and/or conversion, short-circuit protection, and the like. Alternatively, one or more dedicated hardware or firmware chips may be used to condition and process particular signals before being supplied to the CPU. As generally illustrated in the representative embodiment of FIG. 1, controller 50 may communicate signals to and/or from engine 14, disconnect clutch 26, M/G 18, battery 20, launch clutch 34, transmission gearbox 24, and power electronics 56. Although not explicitly illustrated, those of ordinary skill in the art will recognize various functions or components that may be controlled by controller 50 within each of the subsystems identified above. Representative examples of parameters, systems, and/or components that may be directly or indirectly actuated using control logic and/or algorithms executed by the controller include fuel injection timing, rate, and duration, throttle valve position, spark plug ignition timing (for spark-ignition engines), intake/exhaust valve timing and duration, front-end accessory drive (FEAD) components such as an alternator, air conditioning compressor, battery charging or discharging (including determining the maximum charge and discharge power limits), regenerative braking, M/G operation, clutch pressures for disconnect clutch 26, launch clutch 34, and transmission gearbox 24, and the like. Sensors communicating input through the I/O interface may be used to indicate turbocharger boost pressure, crankshaft position (PIP), engine rotational speed (RPM), wheel speeds (WS1, WS2), vehicle speed (VSS), coolant temperature (ECT), intake manifold pressure (MAP), accelerator pedal position (PPS), ignition switch position (IGN), throttle valve position (TP), air temperature (TMP), exhaust gas oxygen (EGO) or other exhaust gas component concentration or presence, intake air flow (MAF), transmission gear, ratio, or mode, transmission oil temperature (TOT), transmission turbine speed (TS), torque converter bypass clutch 34 status (TCC), deceleration or shift mode (MDE), battery temperature, voltage, current, or state of charge (SOC) for example.

Control logic or functions performed by controller 50 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 50. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

An accelerator pedal 52 is used by the driver of the vehicle to provide a demanded torque, power, or drive command to propel the vehicle. In general, depressing and releasing the accelerator pedal 52 generates an accelerator pedal position signal that may be interpreted by the controller 50 as a demand for increased power or decreased power, respectively. A brake pedal 58 is also used by the driver of the vehicle to provide a demanded braking torque to slow the vehicle. In general, depressing and releasing the brake pedal 58 generates a brake pedal position signal that may be interpreted by the controller 50 as a demand to decrease the vehicle speed. Based upon inputs from the accelerator pedal 52 and brake pedal 58, the controller 50 commands the torque to the engine 14, M/G 18, and friction brakes 60. The controller 50 also controls the timing of gear shifts within the gearbox 24, as well as engagement or disengagement of the disconnect clutch 26 and the torque converter bypass clutch 34. Like the disconnect clutch 26, the torque converter bypass clutch 34 can be modulated across a range between the engaged and disengaged positions. This produces a variable slip in the torque converter 22 in addition to the variable slip produced by the hydrodynamic coupling between the impeller and the turbine. Alternatively, the torque converter bypass clutch 34 may be operated as locked or open without using a modulated operating mode depending on the particular application.

To drive the vehicle with the engine 14, the disconnect clutch 26 is at least partially engaged to transfer at least a portion of the engine torque through the disconnect clutch 26 to the M/G 18, and then from the M/G 18 through the torque converter 22 and gearbox 24. The M/G 18 may assist the engine 14 by providing additional power to turn the shaft 30. This operation mode may be referred to as a "hybrid mode" or an "electric assist mode."

To drive the vehicle with the M/G 18 as the sole power source, the power flow remains the same except the disconnect clutch 26 isolates the engine 14 from the remainder of the powertrain 12. Combustion in the engine 14 may be disabled or otherwise OFF during this time to conserve fuel. The traction battery 20 transmits stored electrical energy through wiring 54 to power electronics 56 that may include an inverter, for example. The power electronics 56 convert DC voltage from the battery 20 into AC voltage to be used by the M/G 18. The controller 50 commands the power electronics 56 to convert voltage from the battery 20 to an AC voltage provided to the M/G 18 to provide positive or negative torque to the shaft 30. This operation mode may be referred to as an "electric only" or "EV" operation mode.

In any mode of operation, the M/G 18 may act as a motor and provide a driving force for the powertrain 12. Alternatively, the M/G 18 may act as a generator and convert kinetic energy from the powertrain 12 into electric energy to be stored in the battery 20. The M/G 18 may act as a generator while the engine 14 is providing propulsion power for the vehicle 10, for example. The M/G 18 may additionally act as a generator during times of regenerative braking in which torque and rotational (or motive) energy or power from spinning wheels 42 is transferred back through the gearbox 24, torque converter 22, (and/or torque converter bypass clutch 34) and is converted into electrical energy for storage in the battery 20.

The battery 20 and the M/G 18 may also be configured to provide electrical power to one or more vehicle accessories 62. The vehicle accessories 62 may include, but are not limited to, air conditioning systems, power steering systems, electric heaters, or any other system or device that is electrically operated.

An integrated starter-generator (ISG) 64 may be coupled to the engine 14 (i.e., may be coupled to the crankshaft 28 of the engine 14). The ISG 64 may be configured to operate as a motor to start the engine 14 during an engine start-up event, or to provide additional torque to the powertrain 12 during vehicle operations. The ISG 64 may also be configured to receiving torque from the engine 14 and operate as a generator. The ISG 64 may be selectively coupled to the engine by a clutch 66, belt 68, and a pair of pulleys 70. If the ISG 64 is coupled to the engine by a belt 68 it may be referred to as a belt integrated starter-generator (BISG). The controller 50 may be configured to transmit signals to the ISG 64 to operate the ISG 64 as either a motor or a generator. The controller may also be configured to transmit signals to the clutch 66 in order to open or close the clutch 66. The ISG 64 will be coupled to the engine 14 when the clutch is in a closed state and decoupled from the engine 14 when the clutch 66 is in an open state. The ISG 64 may be configured to provide electrical energy to charge an accessory battery 72, the traction battery 20, or provide electrical energy to power the vehicle accessories 62 when operating as a generator. The accessory battery 72 may also be configured to power the vehicle accessories 62.

The controller 50 may be configured to receive various states or conditions of the various vehicle components illustrated in FIG. 1 via electrical signals. The electrical signals may be delivered to the controller 50 from the various components via input channels. Additionally, the electrical signals received from the various components may be indicative of a request or a command to change or alter a state of one or more of the respective components of the vehicle 10. The controller 50 includes output channels that are configured to deliver requests or commands (via electrical signals) to the various vehicle components. The controller 50 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel into one element may operate as an input channel to another element and vice versa.

It should be understood that the schematic illustrated in FIG. 1 is merely representative and is not intended to be limiting. Other configurations are contemplated that utilize selective engagement of both an engine and a motor to transmit power through the transmission. For example, the M/G 18 may be offset from the crankshaft 28, and/or the M/G 18 may be provided between the torque converter 22 and the gearbox 24. Other configurations are contemplated without deviating from the scope of the present disclosure.

It should be understood that the schematic illustrated in FIG. 1 is merely exemplary and is not intended to be limited. Other configurations are contemplated that utilize selective engagement of both an engine and a motor to transmit through the transmission. For example, the M/G 18 may be offset from the crankshaft 28, an additional motor may be provided to start the engine 14, and/or the M/G 18 may be provided between the torque converter 22 and the gearbox 24. Other configurations are contemplated without deviating from the scope of the present disclosure.

In conventional (non-hybrid) vehicles, the engine provides a small amount of torque ("creep torque") when the engine is at idle. When the brakes are applied, and the engine remains idling with the transmission in gear, the creep torque can be counteracted by the friction brakes. The creep torque can also be utilized to hold a vehicle on an incline, so long as the weight of the vehicle along the incline is enough to overcome the creep torque generated by the engine.

In a hybrid vehicle, such as the hybrid vehicle of FIG. 1, the M/G 18 can also provide creep torque to slightly propel or hold the vehicle motionless on an incline. To do so, the controller 50 can determine whether the vehicle is in a creep mode. This determination may be based on, for example, the vehicle being in a driving gear, moving at a slow speed or being motionless, and the driver applying little to no force on the accelerator pedal. Of course, other factors or combinations of factors may be employed for the controller to determine that the vehicle is in a creep mode.

When the hybrid vehicle is in the creep mode, the vehicle has two torque sources, the engine and the motor that are used to propel the vehicle in creep mode. To improve fuel economy, the engine 14 may be shut down and disconnected from the driveline so the M/G 18 is the only source of torque. The speed of the M/G 18 is controlled to a calibrated speed target within minimum and maximum speed constraints based on the transmission. In a conventional vehicle, the vehicle is stopped as the brake pedal 58 is pressed by the driver, and the engine remains idling with the transmission in gear and the creep torque at the wheels is cancelled by the friction brakes. Because the engine is running and torque is being counteracted by the friction brakes, a waste of energy occurs.

Figure 2:
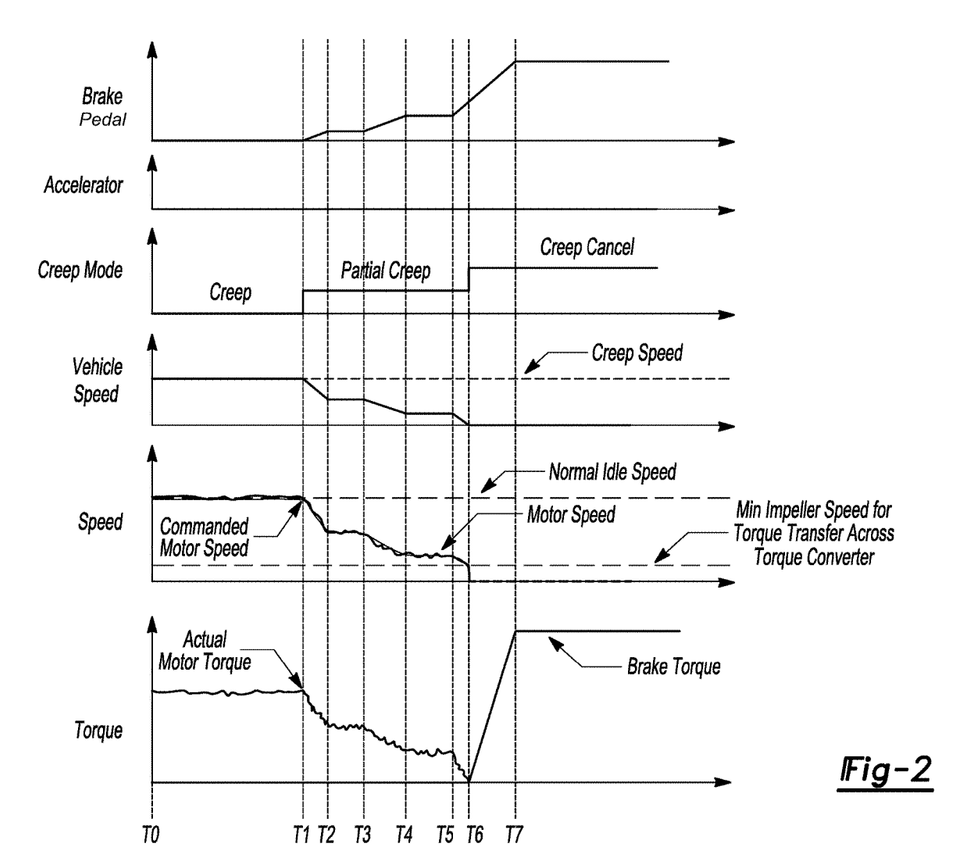
FIG. 2 is a graph illustrating the depression of the brake and accelerator pedals, the creep mode, the vehicle speed, motor speed, motor torque and brake torque.

Referring to FIG. 2, a chart illustrates characteristics of the vehicle implemented by the controller to cancel or partially cancel vehicle creep. The determination of whether to partially or fully cancel creep torque should be based on the driver's intention to slow down or hold the vehicle motionless. For example, the vehicle should understand whether the driver intends to maintain creep torque at the wheels or, alternatively, whether the driver is indicating a desire to stop or hold the vehicle motionless. As another example, the vehicle should understand whether the driver intends to maintain creep while backing up. The vehicle should understand the driver's intention by analyzing the modulation of the brake pedal 58.

Figure 4:
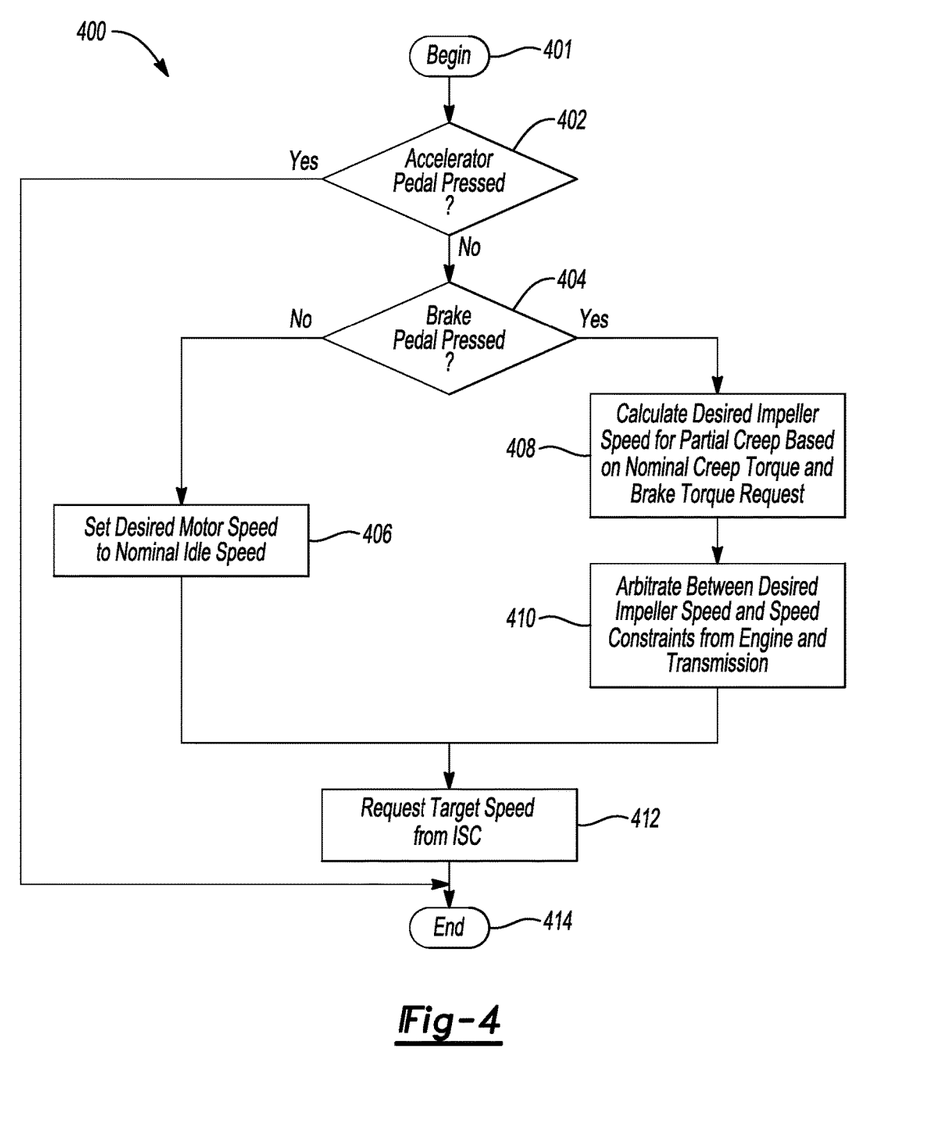
FIG. 4 is a flow chart of the process claimed.

As can be seen in the chart, the accelerator pedal is not pressed at any point when implementing the algorithm described in FIG. 4. Between T0 and T1 the brake is not being pressed and the vehicle is in "creep" moving at a relatively constant speed. During this same period, the electric motor has a speed and a torque that is relatively constant. Between T1 and T6 the brake pedal 58 is progressively pressed down to slow the vehicle. In response to the brake pedal 58 being pressed down or modulated, the controller determines a desired target impeller speed by making several calculations. After calculating the desired target impeller speed, the controller arbitrates between the desired impeller speed and other minimum impeller speed requests. For example, when operating the vehicle in a hybrid mode, where the engine is connected to the driveline and the electric motor is propelling the vehicle, and the motor cannot meet the demanded speed, the minimum impeller speed is dictated by the engine idle speed.

To calculate the target impeller speed, the impeller torque is calculated by using the capacity factor and torque ratio curves in the following equations:

$$\tau_{imp} = \left(\frac{\omega_{imp}}{K(SR)}\right)^2 \qquad (1)$$

$$SR = \frac{\omega_{imp}}{\omega_{tur}} \qquad (2)$$

$$\omega_{imp} = f(\tau_{imp}, \omega_{tur}) \qquad (3)$$

Where $\omega_{impeller}$ is the impeller speed, $\omega_{tur}$ is the turbine speed for the torque converter 22. K is the capacity factor curve and is a function of the speed ratio, SR. The capacity factor curve is obtained by performing tests on a dynamometer. The torque converter capacity factor may be altered to account for ambient temperature and variations in oil viscosity. Equations (1) and (2) may be inverted to provide a one-to-one mapping function between the impeller torque and the impeller speed for a given turbine speed.

Nominal creep torque is the torque measured at the impeller when the vehicle is in creep mode. As mentioned above, creep mode occurs between T0 and T1 and when the driver is not applying the brake pedal. The nominal creep torque $\tau_{creep}^{nominal}$ at the impeller may be calculated by using equations (1) and (2) and the nominal impeller idle speed $\omega_{creep}^{nominal}$. The nominal idle speed is based on various conditions such as, but not limited to, engine coolant temperature, ambient temperature, and catalyst temperature.

Desired brake toque is the torque calculated based on the amount a driver presses or applies the brake pedal 58. As mentioned above, partial creep mode occurs between T1 and T6 as the driver is applying the brake pedal. The desired brake torque is calculated by the following equation:

$$\tau_{brk,imp}^{des} = \frac{\tau_{brk,whl}^{des}}{GR*FDR*T_R(SR)} \quad (4)$$

$\tau_{brk,imp}^{des}$ is the brake torque at impeller. $\tau_{brk,whl}^{des}$ is the driver demanded brake torque at wheel. GR is the torque ratio across transmission. FDR is the final drive ratio. $T_R$ is the torque amplification across torque converter 22 and is a function of SR.

The desired impeller torque is provided by subtracting the desired brake torque at the impeller from the nominal creep torque. The desired creep torque is the torque at the impeller when the vehicle is in partial creep cancel mode.

$$\tau_{creep}^{des} = \tau_{creep}^{nominal} - \tau_{brk,imp}^{des} \quad (5)$$

To partially cancel creep as a driver modulates or presses the brake pedal 58, a modified impeller speed target is calculated in response to the driver pressing the brake pedal. The calculation of the target impeller speed factors is characteristic of the torque converter 22 achieving a desired torque at the wheels.

If the user depresses the brake by a significant amount, the brake torque will be significantly larger than the creep torque. When the brake torque is significantly larger than the creep torque, the motor is spun down to zero and the creep torque is completely removed. This is illustrated in FIG. 2 from T5 to T7. Because the motor is not providing power, fuel economy may be improved.

It should be understood that the vehicle configuration described herein is merely exemplary and is not intended to be limited. Other non-hybrid, electric, or hybrid vehicle configurations should be construed as disclosed herein. Other vehicle configurations may include, but are not limited to, micro-hybrid vehicles, series hybrid vehicles, parallel hybrid vehicles, series-parallel hybrid vehicles, plug-in hybrid electric vehicles (PHEVs), fuel cell hybrid vehicles, battery operated electric vehicles (BEVs), or any other vehicle configuration known to a person of ordinary skill in the art.

Figure 3:
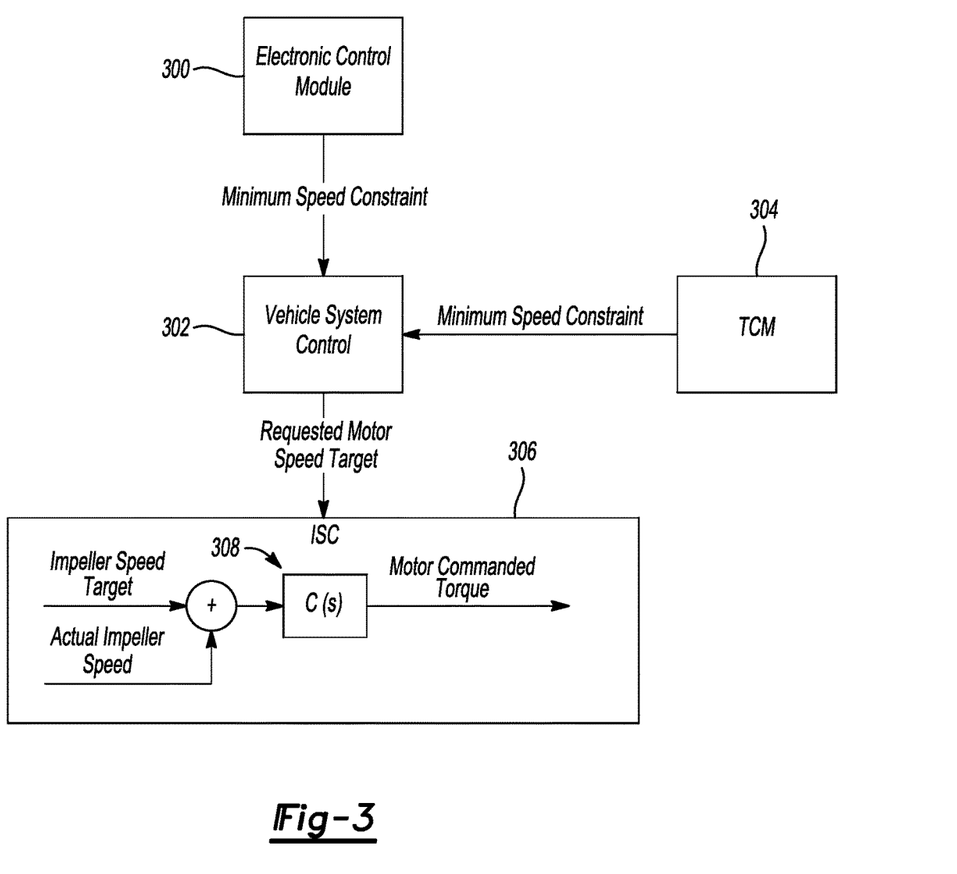
FIG. 3 is a schematic drawing of the vehicle control system.

Referring to FIG. 3, an electronic schematic diagram of a vehicle motor controls are illustrated. An idle speed controller (ISC) 306 receives a motor speed target from a vehicle controller 302. As previously mentioned, the motor speed target is calculated in response to the driver pressing the brake pedal and is constrained by the minimum impeller speed constraints from the engine by the engine control module (ECM) 300 and the transmission by the transmission control module 304. The speed controller 308 calculates an error between the desired and actual impeller speed. The speed controller 308 utilizes the calculated error to calculate the desired motor torque. Preferably, the speed controller 308 may be a proportional-integral-derivative controller (PID controller) including a control loop feedback mechanism commonly used in industrial control systems. But the controller may be another type of controller suitable for the purposes already mentioned.

Referring to FIG. 4, a flowchart of the process according to one of the embodiments of this disclosure is illustrated. Step 401 begins in the process and step 402 determines whether the accelerator pedal is depressed. If a user depresses the accelerator the process ends at step 414. If the accelerator is not pressed, the process determines whether the brake pedal is depressed at step 404. If the brake pedal is not depressed, in step 406 the controller sets a desired motor speed according to a nominal idle speed. If at step 404 the controller determines the brake is depressed, the desired impeller speed for partial creep based on nominal creep torque and brake torque request is calculated at step 408. After step 408, the controller arbitrates between desired impeller speed and speed constraints from the engine and the transmission in step 410. In step 412, the controller requests a target speed from the idle speed controller (ISC). The process ends at step 414.

It should be understood that the flowchart in FIG. 4 is for illustrative purposes only and that the method 400 should not be construed as limited to the flowchart in FIG. 4. Some of the steps of the method 400 may be rearranged while others may be omitted entirely.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   an electric machine configured to generate creep torque to move the vehicle; and
   at least one controller programmed to decrease a target speed of a torque converter impeller by a first predetermined amount to create a desired brake torque and partially cancel the creep torque without application of friction brakes in response to a brake pedal being pressed by first predetermined distance while an accelerator pedal is not being pressed, and wherein the first predetermined amount is based on the first predetermined distance.

2. The vehicle of claim 1, wherein the at least one controller is further programmed to reduce a speed of the electric machine to zero in response to the brake pedal being pressed beyond a threshold.

3. The vehicle of claim 1, further comprising an internal combustion engine operatively coupled to the electric machine by a disconnect clutch, wherein the at least one controller is further programmed to limit the decrease such that the target speed does not fall below a threshold that is defined by a speed of the internal combustion engine.

4. The vehicle of claim 3, further comprising a transmission operatively coupled between the internal combustion engine and the electric machine, wherein the transmission has a torque ratio of an input torque divided by an output torque and wherein an amount of the decrease is at least partially based on the torque ratio of the transmission.

5. The vehicle of claim 4, further comprising at least two wheels and a final drive operatively coupled to the at least two wheels and the transmission, wherein the final drive includes at least two gears that define a final drive ratio and wherein an amount of the decrease is based on the final drive ratio.

6. The vehicle of claim 1, wherein an amount of the decrease is based on a speed of the torque converter impeller divided by a speed of torque converter turbine.

7. A method for a hybrid vehicle comprising:
reducing, by a controller, a target speed of a torque converter impeller to create a desired brake torque and partially cancel creep torque without application of friction brakes in response to a brake pedal being pressed while an accelerator pedal is not being pressed.

8. The method of claim 7, further comprising reducing a speed of an electric machine to zero in response to the brake pedal being pressed.

9. The method of claim 7, wherein the reducing is based upon oil viscosity.

10. The method of claim 7, wherein the reducing is based upon a torque ratio of a transmission.

11. The method of claim 7, wherein the partial cancellation of the creep torque results in a decrease in speed of the vehicle.

12. The method of claim 11, further comprising engaging friction brakes to hold the vehicle.

13. A system for a vehicle comprising:
an electric machine configured to generate creep torque; and
at least one controller programmed to decrease a target speed of a torque converter impeller from an impeller idle speed to a minimum speed to create a desired brake torque and partially cancel creep torque without application of friction brakes in response to a brake pedal being pressed by a predetermined distance while an accelerator pedal is not being pressed, wherein a difference between the impeller idle speed and the minimum speed is based on the predetermined distance.

14. The system of claim 13 further comprising an internal combustion engine, wherein the impeller idle speed is equal to an idle speed of the internal combustion.

15. The system of claim 14, wherein the impeller idle speed is at least based upon an engine coolant temperature.

16. The system of claim 13, wherein the target speed is based upon a target impeller torque.

17. The system of claim 16 further comprising a transmission defining a torque ratio, wherein the target impeller torque is at least based upon the torque ratio.

18. The system of claim 16, wherein the target speed of the torque converter impeller is at least based upon a desired brake torque measured at a wheel.

* * * * *